United States Patent
Zhang

(10) Patent No.: US 10,644,361 B2
(45) Date of Patent: May 5, 2020

(54) ELECTRONIC DEVICE AND METHOD FOR CHARGING AND MANAGING POWER OF ELECTRONIC DEVICE

(71) Applicant: SHENZHEN JINGJIANG YUNCHUANG TECHNOLOGY CO., LTD., Shenzhen (CN)

(72) Inventor: Xue-Qin Zhang, Shenzhen (CN)

(73) Assignee: Shenzhen Jingjiang Yunchuang Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/013,935

(22) Filed: Jun. 21, 2018

(65) Prior Publication Data

US 2019/0198939 A1 Jun. 27, 2019

(30) Foreign Application Priority Data

Dec. 25, 2017 (CN) .......................... 2017 1 1423899

(51) Int. Cl.
*H02J 7/00* (2006.01)
*H01M 10/44* (2006.01)
*H02J 7/35* (2006.01)

(52) U.S. Cl.
CPC ......... *H01M 10/441* (2013.01); *H02J 7/0021* (2013.01); *H02J 7/0027* (2013.01); *H02J 7/007184* (2020.01); *H02J 7/35* (2013.01)

(58) Field of Classification Search
CPC .... Y02T 10/7055; Y02E 60/12; H02J 7/0018; H01M 10/441
USPC .......................................................... 320/118
See application file for complete search history.

(56) References Cited

U.S. PATENT DOCUMENTS

| | | | | |
|---|---|---|---|---|
| 8,860,371 B2 * | 10/2014 | Yang | ..................... | H02J 7/0024 320/113 |
| 2008/0211459 A1 * | 9/2008 | Choi | ..................... | B60L 3/0046 320/134 |
| 2014/0176148 A1 * | 6/2014 | Makihara | .............. | H02J 7/0021 324/434 |
| 2017/0271900 A1 * | 9/2017 | Rose | .................... | H01R 25/006 |

\* cited by examiner

*Primary Examiner* — Arun C Williams
(74) *Attorney, Agent, or Firm* — ScienBiziP, P.C.

(57) ABSTRACT

An electronic device includes an M number of charging units, a battery pack including an N number of batteries, and an N number of voltage sensors. A method for charging and managing power of the electronic device includes determining an X number of charging units from the M number of charging units for charging the battery pack, detecting a voltage of the N number of batteries, selecting at least one battery from the N number of batteries as a first target battery, and controlling the X number of charging units to charge the first target battery. M, N, and X are positive integers and X is less than or equal to M.

8 Claims, 4 Drawing Sheets

ELECTRONIC DEVICE AND METHOD FOR CHARGING AND MANAGING POWER OF ELECTRONIC DEVICE

CROSS-REFERENCE TO RELATED APPLICATIONS

This application claims priority to Chinese Patent Application No. 201711423899.8 filed on Dec. 25, 2017, the contents of which are incorporated by reference herein.

FIELD

The subject matter herein generally relates to electronic devices, and more particularly to an electronic device and a method for charging and managing power of the electronic device.

BACKGROUND

Electronic devices may be charged by a variety of methods, such as by solar charging, temperature difference charging, USB charging, and wireless charging. Generally, the electronic device is charged by one method at a time.

BRIEF DESCRIPTION OF THE DRAWINGS

Implementations of the present disclosure will now be described, by way of example only, with reference to the attached figures.

DETAILED DESCRIPTION

Figure 1:
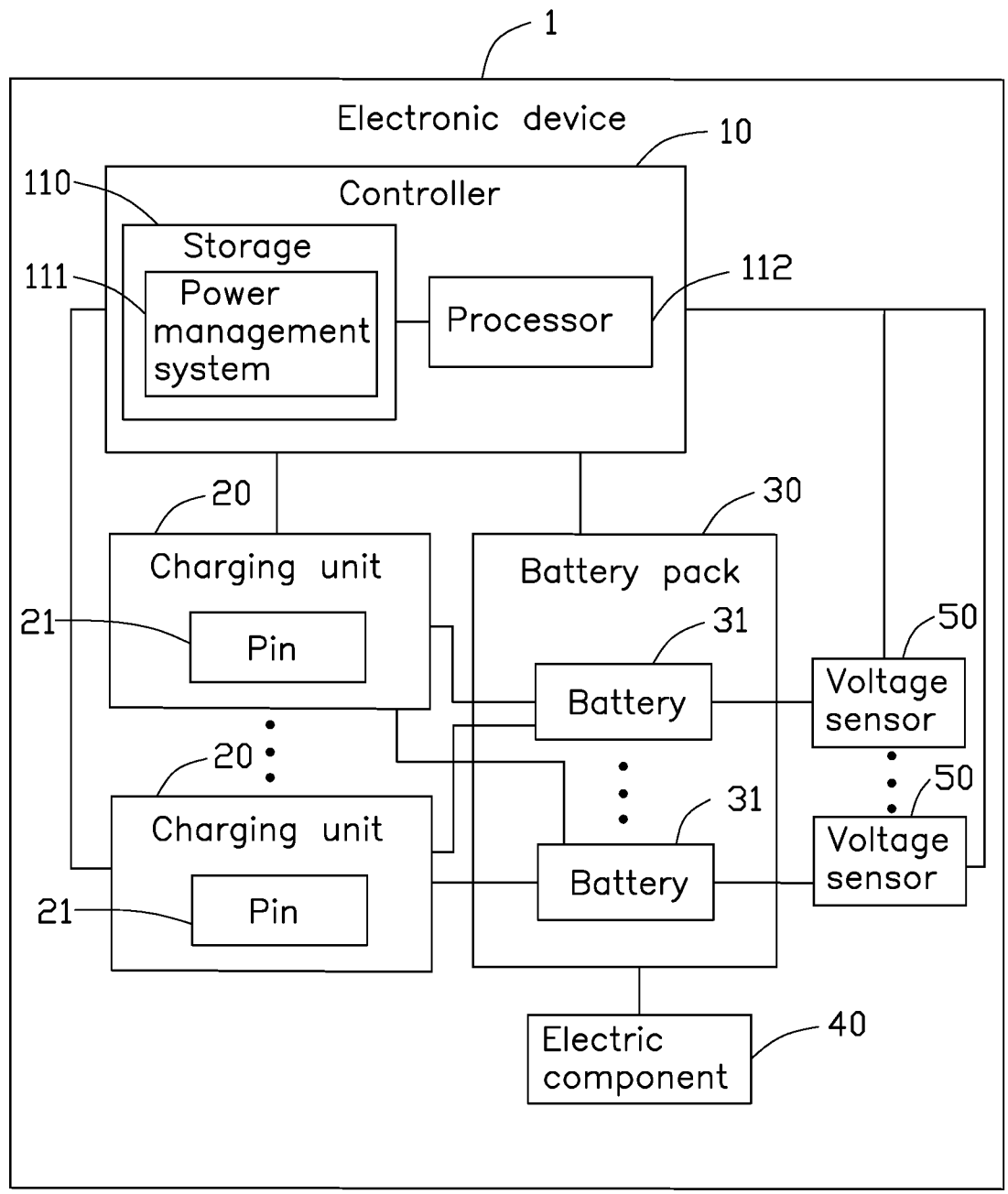
FIG. 1 is a block diagram of an electronic device in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 illustrates an electronic device 1, which includes, but is not limited to, a controller 10, an M number of charging units 20, a battery pack 30 including an N number of batteries 31, at least one electric component 40, and an N number of voltage sensors 50. The controller 10, the M number of charging units 20, the battery pack 30, the at least one electric component 40, and the N number of voltage sensors 50 are electrically coupled together. M and N are positive integer values greater than or equal to 1. The at least one electric component may comprise, for example, a camera or a display or other electric components used in the electronic device. The electronic device 1 may comprise, for example, a personal computer, a server, a mobile phone, a wearable device, or a toy.

The controller 10 includes, but is not limited to, a storage 110, a power management system 111, and a processor 112. The controller 10 uses the processor 112 to execute the power management system 111 stored in the storage 110 to manage power of the electronic device 1.

Each charging unit 20 may include a pin 21. When the pin 21 is at a high-level voltage, the charging unit 20 provides power to the battery pack 30. When the pin 21 is at a low-level voltage, the charging unit 20 does not provide power to the battery pack 30. For example, one of the charging units 20 may be a USB charging unit 20, and when a USB cable plugs into the USB charging unit 20 and is electrically coupled to a power source, the pin 21 of the USB charging unit 20 is at a high-level voltage. When the USB cable is unplugged from the USB charging unit 20, the pin 21 of the USB charging unit 20 is at a low-level voltage and does not charge the battery pack 30.

In one embodiment, when the battery pack 30 includes a plurality of batteries 31 (that is, N is a positive integer greater than 1), the batteries 31 are electrically coupled neither in series nor in parallel.

In at least one embodiment, the M number of charging units 20 can charge one battery 31 or multiple batteries 31 at the same time.

The controller 10 controls the M number of charging units 20 through the power management system 111 to charge the N number of batteries 31, and further controls the N number of batteries 31 to provide power to the electric component 40. The electric component 40 may be any electric component of the electronic device 1, for example, a camera, a flash, or a display.

In at least one embodiment, each battery 31 is electrically coupled to a corresponding voltage sensor 50. The voltage sensor 50 senses a voltage of the battery 31.

In at least one embodiment, the M number of charging units 20 include, but are not limited to, a solar charging unit, a temperature difference charging unit, a USB charging unit, and a wireless charging unit.

Figure 2:
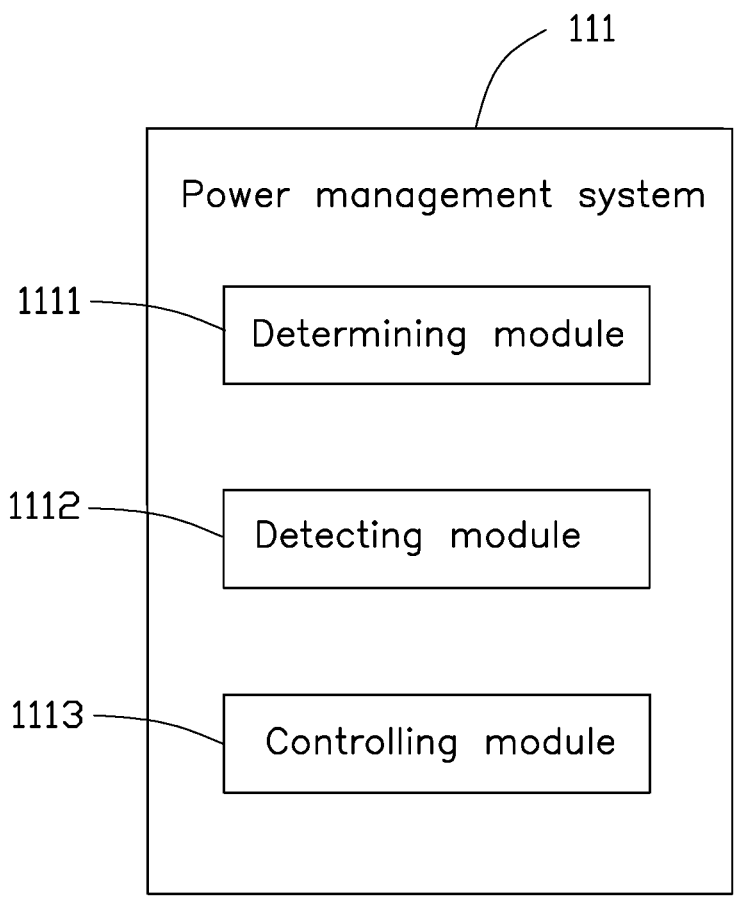
FIG. 2 is a block diagram of a power management system of the electronic device of FIG. 1.

Referring to FIG. 2, in another embodiment, the power management system 111 includes a plurality of modules, such as a determining module 1111, a detecting module 1112, and a controlling module 1113. The modules 1111-

1113 can include one or more software programs in the form of computerized codes stored in the storage 110. The computerized codes can include instructions executed by the processor 112 to provide functions for the modules 1111-1113.

Figure 3:
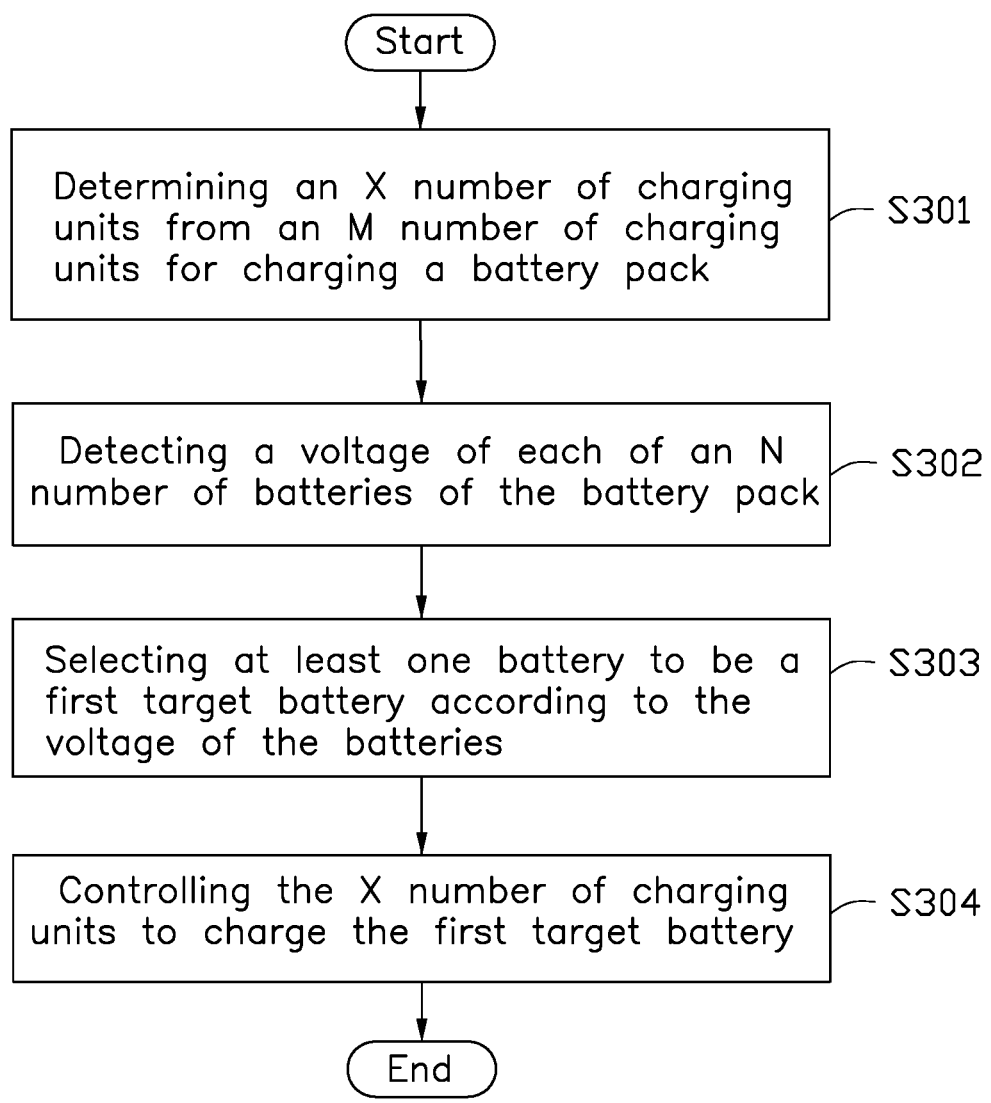
FIG. 3 is a flowchart of a method for charging the electronic device of FIG. 1.

FIG. 3 illustrates a flowchart of an exemplary method for charging an electronic device. The example method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block 301.

At block 301, the determining module 1111 determines an X number of charging units 20 from the M number of charging units 20 for charging the battery pack 30.

In at least one embodiment, the determining module 1111 detects a high-level voltage of the pins 21 of the M number of charging units 20 and determines the X number of charging units 20 as the charging units 20 having the pins 21 at a high-level voltage.

In a first embodiment, X is a positive integer less than or equal to M, and the pins 21 of the X number of charging units 20 are each at a high-level voltage. The X number of charging units 20 charge the batteries 31.

In a second embodiment, X is equal to 1. The determining module 1111 determines the X number of charging units 20 by first ranking the M number of charging units 20 and determining in sequence which of the M number of charging units 20 have the pin 21 at the high-level voltage. The first charging unit 20 having the pin 21 at the high-level voltage is determined as the X charging unit 20 to charge the batteries 31.

For example, the M number of charging units 20 include four charging units 20. The four charging units 20 include a wireless charging unit, a USB charging unit, a temperature difference charging unit, and a solar charging unit. The determining module 1111 may rank the charging units 20 according to environmental protection, so the determining module 1111 ranks the charging units 20 as the solar charging unit, the temperature difference charging unit, the wireless charging unit, and the USB charging unit in that order. Thus, the determining module 1111 first determines whether the pin 21 of the solar charging unit is at the high-level voltage. When the pin 21 of the solar charging unit is at the high-level voltage, the determining module 1111 determines the solar charging unit as the charging unit 20 to charge the battery 31. When the pin 21 of the solar charging unit is at the low-level voltage, the determining module 1111 determines whether the pin 21 of the next charging unit 20 (the temperature difference charging unit) is at the high-level voltage. The determining module 1111 goes down the rank of charging units 20 until the determining module 1111 determines that the pin 21 of one of the charging units 20 is at the high-level voltage.

In a third embodiment, X is equal to 1, the determining module 1111 determines which of the charging units 20 have the pin 21 at the high-level voltage, and randomly determines one of the charging units 20 to charge the batteries 31.

For example, when the pins 21 of the solar charging unit, the temperature difference charging unit, and the wireless charging unit are at the high-level voltage, the determining module 1111 may randomly select one to charge the battery pack 30.

In at least one embodiment, when the pins 21 of all of the charging units 20 are at the low-level voltage, the determining module 1111 may wait for a designated amount of time, such as one or two seconds, and then determine whether the pin 21 of any of the charging units 20 is at the high-level voltage.

At block 302, when the determining module 1111 determines the X number of charging units 20 for charging the battery pack 30, the detecting module 1112 uses the N number of voltage detectors 50 to detect a voltage of each of the N number of batteries 31 of the battery pack 30.

At block 303, the determining module 1111 selects at least one battery 31 to be a first target battery 31 according to the voltage of the batteries 31.

In at least one embodiment, the determining module 1111 selects the battery 31 having the lowest voltage as the first target battery 31. In another embodiment, the determining modules 1111 can randomly select one of the batteries 31 having a voltage less than a preset voltage as the first target battery 31.

In at least one embodiment, the first target battery 31 is not currently charging or providing power.

At block 304, the controlling module 1113 controls the X number of charging units 20 to charge the first target battery 31.

Figure 4:
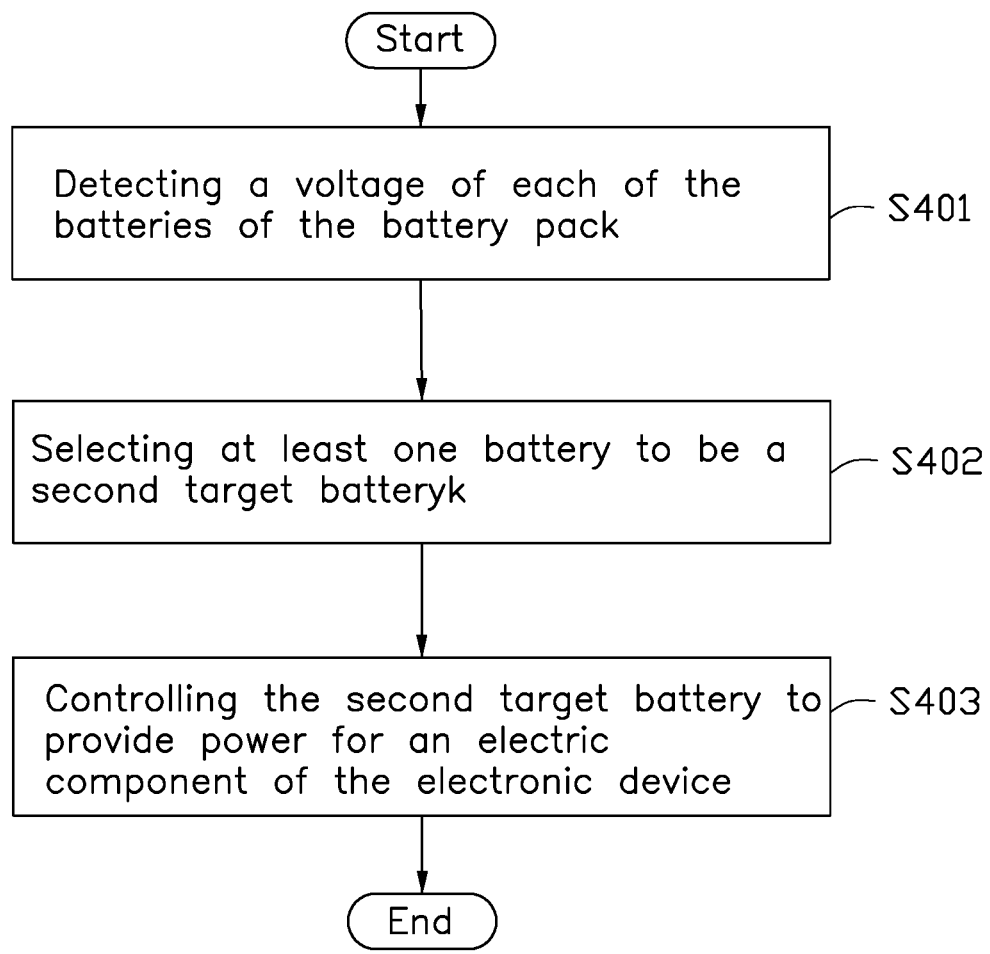
FIG. 4 is a flowchart of a method for managing power of the electronic device of FIG. 1.

FIG. 4 illustrates a flowchart of an exemplary method for managing power of an electronic device. The example method is provided by way of example, as there are a variety of ways to carry out the method. The method described below can be carried out using the configurations illustrated in FIGS. 1-2, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block 401.

At block 401, the detecting module 1112 uses the N number of voltage sensors 50 to detect a voltage of each of the batteries 31 of the battery pack 30.

At block 402, the determining module 1111 selects at least one battery 31 to be a second target battery 31.

In at least one embodiment, the determining module 1111 selects the second target battery 31 to be the battery 31 having a largest voltage. In another embodiment, the determining module 1111 randomly selects the second target battery 31 from the batteries 31 having a voltage greater than a preset value.

In at least one embodiment, the second target battery 31 is not currently being charged.

At block 403, the controlling module 1113 controls the second target battery 31 to provide power. For example, the controlling module 1113 controls the second target battery 31 to provide power for the electric component 40.

In another embodiment, the determining module 1111 further determines whether a power of the second target battery is less than a preset amount (such as 1%). When the power of the second target battery 31 is less than the preset amount, the determining module 1111 reselects the battery 31 of the battery group 30 having the largest voltage to be the second target battery 31, so that the battery pack 30 continues to provide power for the electric component 40.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic device comprising:
   an M number of charging units;
   a battery pack comprising an N number of batteries;
   an N number of voltage sensors;
   one or more non-transitory computer-readable media having computer-executable instructions embodied thereon; and
   at least one processor coupled to the one or more non-transitory computer-readable media, and configured to execute the computer-executable instructions to:
      determine an X number of charging units from the M number of charging units for charging the battery pack, wherein M, N, and X are positive integers and X is less than or equal to M;
      detect, using the voltage sensors, a voltage of the N number of batteries;
      select at least one battery from the N number of batteries as a first target battery; and
      control the X number of charging units to charge the first target battery,
   wherein the at least one processor selects at least one battery from the N number of batteries as a second target battery and controls the second target battery to provide power for electric components in the electronic device.

2. The electronic device of claim 1, wherein each of the M number of charging units comprises a pin; the at least one processor determines the X number of charging units by detecting a voltage of the pins; the pins of the X number of charging units have a high-level voltage.

3. The electronic device of claim 1, wherein the at least one processor selects the first target battery from the N number of batteries by selecting the battery having a lowest voltage of the N number of batteries as the first target battery.

4. The electronic device of claim 1, wherein the at least one processor determines whether a voltage of the second target battery is less than a preset value; when the voltage of the second target battery is less than the preset value, the at least one processor reselects the second target battery from the other batteries of the N number of batteries as the battery having a greatest voltage.

5. A method for charging and managing power of an electronic device comprising an M number of charging units, a battery pack comprising an N number of batteries, and an N number of voltage sensors, the method comprising:
   determining an X number of charging units from the M number of charging units for charging the battery pack, wherein M, N, and X are positive integers and X is less than or equal to M;
   detecting, using the voltage sensors, a voltage of the N number of batteries;
   selecting at least one battery from the N number of batteries as a first target battery; and
   controlling the X number of charging units to charge the first target battery,
   wherein the processor selects at least one battery from the N number of batteries as a second target battery and controls the second target battery to provide power for electric components in the electronic device.

6. The method of claim 5, wherein each of the M number of charging units comprises a pin; the processor confirms the X number of charging units by detecting a voltage of the pins; the pins of the X number of charging units have a high-level voltage.

7. The method of claim 5, wherein the first target battery from the N number of batteries is selected by selecting the battery having a lowest voltage of the N number of batteries as the first target battery.

8. The method of claim 5, wherein whether a voltage of the second target battery is less than a preset value is determined; when the voltage of the second target battery is less than the preset value, the second target battery is reselected from the other batteries of the N number of batteries as the battery having a greatest voltage.

* * * * *